United States Patent
Susai et al.

(10) Patent No.: US 9,148,493 B2
(45) Date of Patent: *Sep. 29, 2015

(54) APPARATUS, METHOD AND COMPUTER PROGRAM PRODUCT FOR EFFICIENTLY POOLING CONNECTIONS BETWEEN CLIENTS AND SERVERS

(71) Applicant: Citrix Systems, Inc., Fort Lauderdale, FL (US)

(72) Inventors: Michel K. Susai, San Jose, CA (US); Rajiv Sinha, San Jose, CA (US); Anil Shetty, Union City, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/107,971

(22) Filed: Dec. 16, 2013

(65) Prior Publication Data

US 2014/0108513 A1 Apr. 17, 2014

Related U.S. Application Data

(63) Continuation of application No. 12/855,260, filed on Aug. 12, 2010, now Pat. No. 8,631,120, which is a continuation of application No. 09/690,437, filed on Oct. 18, 2000, now Pat. No. 7,801,978.

(51) Int. Cl.
*G06F 15/16* (2006.01)
*H04L 29/06* (2006.01)
*H04L 29/08* (2006.01)

(52) U.S. Cl.
CPC .............. *H04L 67/42* (2013.01); *H04L 29/06* (2013.01); *H04L 67/14* (2013.01); *H04L 67/325* (2013.01); *H04L 69/163* (2013.01); *H04L 69/16* (2013.01); *H04L 69/22* (2013.01); *H04L 69/329* (2013.01)

(58) Field of Classification Search
CPC .......................... H04L 29/08072; H04L 29/06
USPC .......................................................... 709/203
See application file for complete search history.

(56) References Cited

U.S. PATENT DOCUMENTS

| 5,553,242 A | 9/1996 | Russell et al. |
| 5,754,774 A | 5/1998 | Bittinger et al. |

(Continued)

FOREIGN PATENT DOCUMENTS

| WO | WO-98/06033 A1 | 2/1998 |
| WO | WO-00/28433 A2 | 5/2000 |

(Continued)

OTHER PUBLICATIONS

U.S. Appl. No. 60/239,552, filed Oct. 10, 2000, Peiffer et al.

(Continued)

*Primary Examiner* — Tauqir Hussain
(74) *Attorney, Agent, or Firm* — Foley & Lardner LLP; Christopher J. McKenna; Daniel E. Rose

(57) ABSTRACT

An apparatus, method and computer program product for efficiently pooling network client-server connections. The apparatus is implemented within an interface unit connecting a plurality of servers to the Internet, which is in turn connected to a plurality of clients. The method includes the steps of opening a connection between a first client and the interface unit; determining whether a connection between the interface unit and a server is finished being utilized by the first client; opening a connection between a second client and the interface unit; if no free connection is open between the interface unit and the server, then allowing the second client to access information on the server via the same connection utilized by the first client without waiting for the first client to initiate closing the connection; and delinking the connections between the first and second clients and the interface unit while keeping open the connection between the interface unit and the server.

20 Claims, 12 Drawing Sheets

(56) References Cited

U.S. PATENT DOCUMENTS

| | | |
|---|---|---|
| 5,774,660 A | 6/1998 | Brendel et al. |
| 5,774,670 A | 6/1998 | Montulli |
| 5,787,470 A | 7/1998 | DeSimone et al. |
| 5,835,724 A | 11/1998 | Smith |
| 5,852,717 A | 12/1998 | Bhide et al. |
| 5,918,013 A | 6/1999 | Mighdoll et al. |
| 5,941,988 A | 8/1999 | Bhagwat et al. |
| 5,943,408 A | 8/1999 | Chen et al. |
| 5,964,836 A | 10/1999 | Rowe et al. |
| 6,006,268 A | 12/1999 | Coile et al. |
| 6,055,564 A | 4/2000 | Phaal |
| 6,085,247 A | 7/2000 | Parsons et al. |
| 6,105,067 A | 8/2000 | Batra |
| 6,163,812 A | 12/2000 | Gopal et al. |
| 6,173,322 B1 | 1/2001 | Hu |
| 6,189,033 B1 | 2/2001 | Jin et al. |
| 6,201,962 B1 | 3/2001 | Sturniolo et al. |
| 6,212,565 B1 | 4/2001 | Gupta |
| 6,226,684 B1 | 5/2001 | Sung et al. |
| 6,259,705 B1 | 7/2001 | Takahashi et al. |
| 6,295,551 B1 | 9/2001 | Roberts et al. |
| 6,308,238 B1 | 10/2001 | Smith et al. |
| 6,314,465 B1 | 11/2001 | Paul et al. |
| 6,338,089 B1 | 1/2002 | Quinlan |
| 6,349,337 B1 | 2/2002 | Parsons et al. |
| 6,389,462 B1 | 5/2002 | Cohen et al. |
| 6,397,253 B1 | 5/2002 | Quinlan et al. |
| 6,411,986 B1 * | 6/2002 | Susai et al. .............. 709/203 |
| 6,412,009 B1 | 6/2002 | Erickson et al. |
| 6,434,543 B1 | 8/2002 | Goldberg et al. |
| 6,438,597 B1 | 8/2002 | Mosberger et al. |
| 6,453,354 B1 | 9/2002 | Jiang et al. |
| 6,604,046 B1 | 8/2003 | Van Watermulen et al. |
| 6,631,417 B1 | 10/2003 | Balabine |
| 6,690,654 B2 | 2/2004 | Elliott et al. |
| 6,725,272 B1 | 4/2004 | Susai et al. |
| 6,732,269 B1 | 5/2004 | Baskey et al. |
| 6,757,738 B1 | 6/2004 | Cao et al. |
| 6,789,119 B1 | 9/2004 | Zhu et al. |
| 6,820,133 B1 | 11/2004 | Grove et al. |
| 6,829,133 B2 | 12/2004 | Wermer et al. |
| 6,857,009 B1 | 2/2005 | Ferreria et al. |
| 6,973,455 B1 | 12/2005 | Vahalia et al. |
| 7,043,759 B2 | 5/2006 | Kaashoek et al. |
| 7,107,619 B2 | 9/2006 | Silverman |
| 7,207,062 B2 | 4/2007 | Brustoloni |
| 7,301,899 B2 | 11/2007 | Goldstone |
| 7,707,305 B2 | 4/2010 | Afek et al. |
| 7,801,978 B1 | 9/2010 | Susai et al. |
| 2001/0047421 A1 | 11/2001 | Sridhar et al. |
| 2001/0052023 A1 | 12/2001 | Lin et al. |
| 2002/0035683 A1 | 3/2002 | Kaashoek et al. |
| 2002/0042839 A1 | 4/2002 | Peiffer et al. |
| 2002/0052931 A1 | 5/2002 | Peiffer et al. |
| 2002/0083175 A1 | 6/2002 | Afek et al. |
| 2002/0101819 A1 | 8/2002 | Goldstone |
| 2003/0033520 A1 | 2/2003 | Peiffer et al. |
| 2003/0035370 A1 | 2/2003 | Brustoloni |
| 2003/0046577 A1 | 3/2003 | Silverman |
| 2003/0055962 A1 | 3/2003 | Freund et al. |
| 2004/0146053 A1 | 7/2004 | Nabhan et al. |
| 2005/0025150 A1 | 2/2005 | Helmy et al. |

FOREIGN PATENT DOCUMENTS

| | | |
|---|---|---|
| WO | WO 0028433 A2 * | 5/2000 |
| WO | WO-00/45286 A1 | 8/2000 |

OTHER PUBLICATIONS

"NetScreen Offers Free Software Update to Leading Security Appliance to Help E-Businesses Defend Against Attacks". PR Newswire, Feb. 14, 2000. 3 pages.

"WebScaler—Internet Accelerator for Web Sites". NetScaler, Inc, Apr. 2000. 4 pages.

Egevang K. and Francis, P., "The IP Network Address Translator (NAT)," Request for Comments: 1631, May 1994, http://www.safety.net/rfc1631.txt, 9 pages.

European Patent Office Action for Application No. 99958851.0, dated Jul. 17, 2009.

Feldmann, Anja, Ramon Cacere, Fred Douglis, Gideon Glass, and Michael Rabinovich. "Performance of Web Proxy Caching in Heterogeneous Bandwidth Environments". AT&T Labs-Research, 1999.

Final Office Action for U.S. Appl. No. 09/690,437, mailed Aug. 22, 2005. 11 pages.

Final Office Action for U.S. Appl. No. 09/690,437, mailed Feb. 18, 2005. 9 pages.

Final Office Action for U.S. Appl. No. 09/690,437, mailed Jul. 17, 2007. 13 pages.

US Office Action for U.S. Appl. No. 09/690,437, dated Mar. 30, 2009.

US Office Action for U.S. Appl. No. 09/690,437, dated Sep. 22, 2004.

Gettys, J., J. Mogul, H. Frystyk, L. Masinter, P. Leach, and T. Berners-Lee. "Hypertext Transfer Protocol—HTTP/1.1". UC Irvine, Jun. 1999. 22 pages.

Maltz et al, "TCP Splicing for Application Layer Proxy Performance," IBM Research Report 21139 (Computer Science/Mathematics), Mar. 17, 1998, (pp. 1-19).

Mogul, Jeffrey C. "The Case for Persistent-Connection HTTP". Digital Equipment Corporation Western Research Laboratory, 1995.

US Office Action for U.S. Appl. No. 09/690,437, dated Dec. 12, 2006.

US Office Action for U.S. Appl. No. 09/690,437, dated Feb. 10, 2006.

US Office Action for U.S. Appl. No. 09/690,437, dated Jan. 12, 2004.

US Office Action for U.S. Appl. No. 09/690,437, dated Mar. 3, 2008.

US Office Action for U.S. Appl. No. 09/690,437, dated Oct. 7, 2008.

US Notice of Allowance for U.S. Appl. No. 09/690,437, dated May 17, 2010.

International Search Report for PCT/US2001/032445, dated Apr. 25, 2002 (5 Pages).

Spatscheck, O., J. Hansen, J. Hartman, and L. Peterson. "Optimizing TCP Forwarder Performance". Department of Computer Science, The University of Arizona, Feb. 1998.

Supplemental US Office Action for U.S. Appl. No. 09/690,437, dated Mar. 21, 2006.

US Notice of Allowance for U.S. Appl. No. 12/855,260 dated Sep. 12, 2013.

US Office Action for U.S. Appl. No. 12/855,260 dated Dec. 8, 2011.

US Office Action for U.S. Appl. No. 12/855,260 dated May 15, 2012.

Zheng Wang et al., "Prefetching in World Wide Web," University College London, United Kingdom, Nov. 18-22, 1996, (pp. 1-12).

* cited by examiner

APPARATUS, METHOD AND COMPUTER PROGRAM PRODUCT FOR EFFICIENTLY POOLING CONNECTIONS BETWEEN CLIENTS AND SERVERS

CROSS-REFERENCE TO RELATED APPLICATIONS

The present application is a continuation of U.S. patent application Ser. No. 12/855,260, filed Aug. 12, 2010 entitled "Apparatus, Method and Computer Program Product for Efficiently Pooling Connections Between Clients and Servers" which is a continuation of U.S. patent application Ser. No. 09/690,437 entitled "Apparatus, Method and Computer Program Product for Efficiently Pooling Connections Between Clients and Servers" filed Oct. 18, 2000 and has issued as U.S. Pat. No. 7,801,978 on Sep. 21, 2010 which are incorporated by reference in their entirety.

BACKGROUND OF THE INVENTION

1. Field of the Invention

The present invention relates generally to Internet client-server applications, and more specifically to determining when a client is finished, either temporarily (e.g., in "think time") or permanently, with a connection in order to more efficiently utilize the pooling of connections between clients and servers over the Internet.

2. Related Art

The importance to the modern economy of rapid information and data exchange cannot be overstated, This explains the exponentially increasing popularity of the Internet. The Internet is a world-wide set of interconnected computer networks that can be used to access a growing amount and variety of information electronically.

One method of accessing information on the Internet is known as the World Wide Web (www, or the "web"), The web is a distributed, hypermedia system, and functions as a client-server based information presentation system. Information that is intended to be accessible over the web is stored in the form of "pages" on general-purpose computers known as "servers". Computer users can access a web page using general-purpose computers, referred to as "clients," by specifying the uniform resource locator (URL) of the page. FIG. 1 is a network block diagram showing a plurality of clients and servers connected to the Internet.

When a client specifies a URL, a part of the URL known as the Domain Name is passed to a domain server (DNS) to be translated to a network address. The network address specifies the Internet protocol (IP) address of the intended server. The client request is passed to the server having the network address. The server uses the path name in the URL to locate the web page requested by the client. A copy of the web page is then sent to the client for viewing by the user.

The client-server paradigm described above has served the Internet well. However, there are some problems. One problem called server connection loading was described in detail in the commonly-owned, U.S. patent application Ser. No. 09/188,709, filed Nov. 10, 1998, entitled, "Internet Client-Server Multiplexer," incorporated herein by reference in its entirety. For completeness, however, the connection loading problem is briefly described herein.

Servers are designed to do certain things well. Servers are typically general-purpose machines that are optimized for general tasks such as file management, application processing, database processing, and the like. Servers are not optimized to handle switching tasks such as opening and closing network connections. Under certain load conditions, these tasks can represent a considerable overhead, consuming a large percentage of the server's processing resources, often on the order of twenty percent and sometimes up to fifty percent. This problem is referred to herein as "connection loading".

To further explain loading, the client and server must typically exchange three packets of information to setup a connection. Once the connection is established a client sends a URL (page) request to the server, this consists of one or more packets. The server will then send one or more packet responses back to the client. Once a request and response is exchanged from the client and server, both client and server will close their respective connections. The closing of the connection takes an additional four packets of information exchange. As demonstrated above, there is a significant amount of overhead (i.e., seven packets) involved to download one URL. A page typically consists of multiple URL's.

Additional problems associated with connection loading include: Each packet that reaches the server interrupts the server's CPU to move that packet from the Network Interface Card (NIC) into the server's main memory. This results in loss of productivity on the server's CPU. Thus what is needed is a way to avoid wasting valuable CPU time at the server side. As a consequence, the same resource can be applied to process more URL (page) requests. This will thus improve the servers URL processing capacity.

As discussed above, it takes three packets for connection establishment. Furthermore, connection establishment uses up significant server resources related to the CPU/memory. To establish a connection at the server side, the packet needs to be processed by the driver layer, where Ethernet specific information is handled. The driver layer sends the packet to the IP (Internet Protocol) layer for more processing, where all the IP related processing is handled. After this, the packet is passed to TCP (Transmission Control Protocol) layer, where the TCP related information is processed. The TCP layer consumes significant server resources to create a connection table, etc. Thus, what is needed is a way of avoiding connection processing to thereby save significant CPU/memory resources.

The Web server needs to create a thread for each incoming connection to be processed. After the connection and URL request are processed, the thread will be closed. A thread is a Light Weight Process (LWP) that is a type of process. Even though threads are efficient it takes significant CPU and memory resources to create and destroy the threads. Thus, by avoiding thread creation, a significant amount of server resources can be preserved, which in turn can be used to process more web requests.

It is desirable to efficiently solve the connection loading problem by determining when a client is either through with a connection or idle for some period of time in order to more efficiently utilize the pooling of connections between clients and servers over the Internet.

SUMMARY OF THE INVENTION

The present invention is an apparatus, method and computer program product for efficiently pooling network client-server connections. In one embodiment, the present invention is implemented within an interface unit connecting a plurality of servers to the Internet, which is in turn connected to a plurality of clients.

According to one aspect of the invention, the method includes the steps of opening a connection between a first client and the interface unit; determining whether a connection between the interface unit and a server is finished being utilized by the first client; opening a connection between a second client and the interface unit; if no free connection is open between the interface unit and the server, then allowing the second client to access information on the server via the same connection utilized by the first client without waiting for the first client to initiate closing the connection; and delinking the connections between the first and second clients and the interface unit while keeping open the connection between the interface unit and the server.

BRIEF DESCRIPTION OF THE FIGURES

The features and advantages of the present invention will become more apparent from the detailed description set forth below when taken in conjunction with the drawings in which like reference characters identify corresponding elements throughout and wherein.

DETAILED DESCRIPTION OF THE PREFERRED EMBODIMENTS

The present invention is an apparatus, method and computer program product for efficient network client-server connection pooling.

Figure 1:
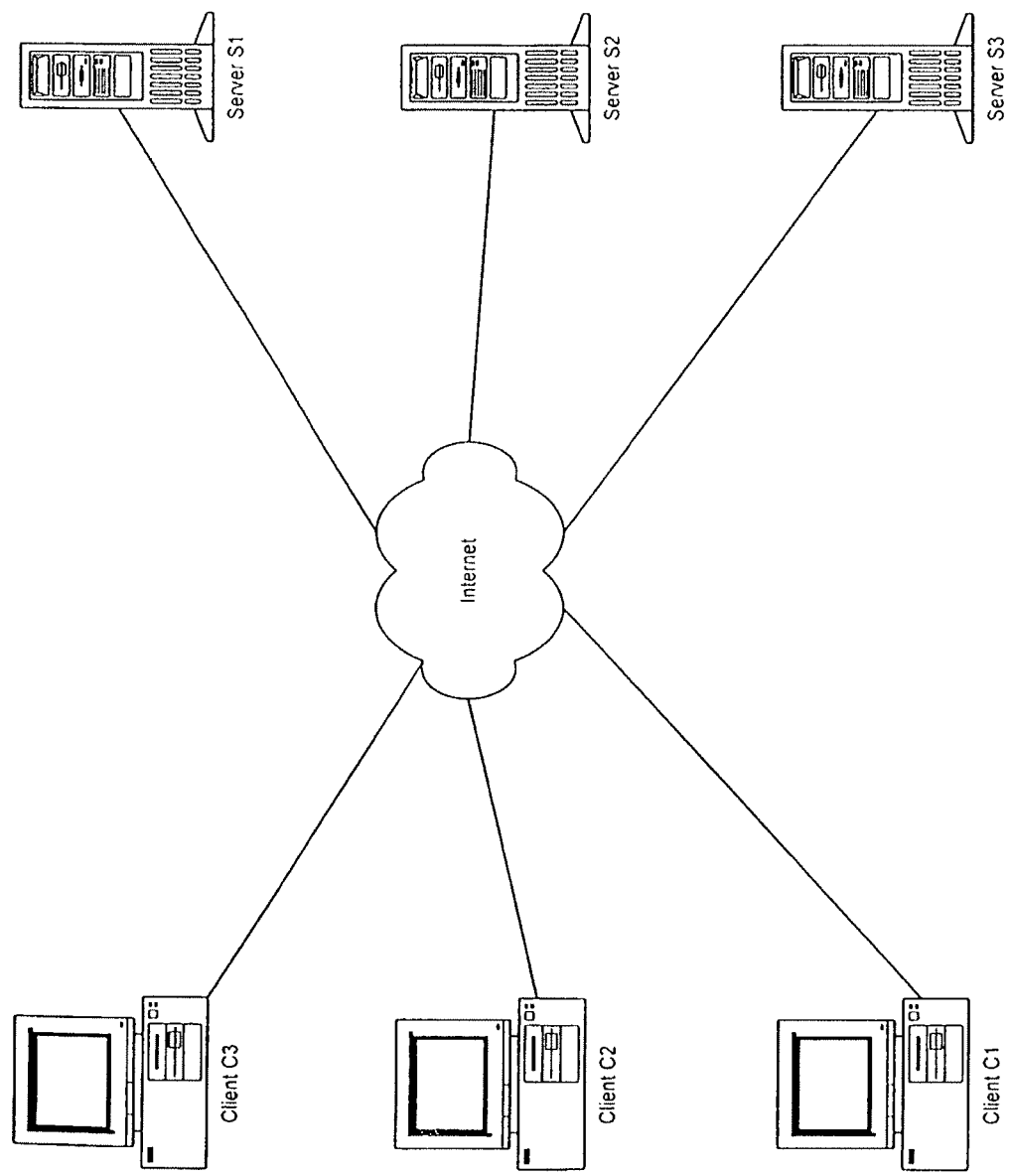
FIG. 1 is a network block diagram showing a plurality of clients and servers connected to the Internet according to an embodiment of the present invention.
Figure 2:
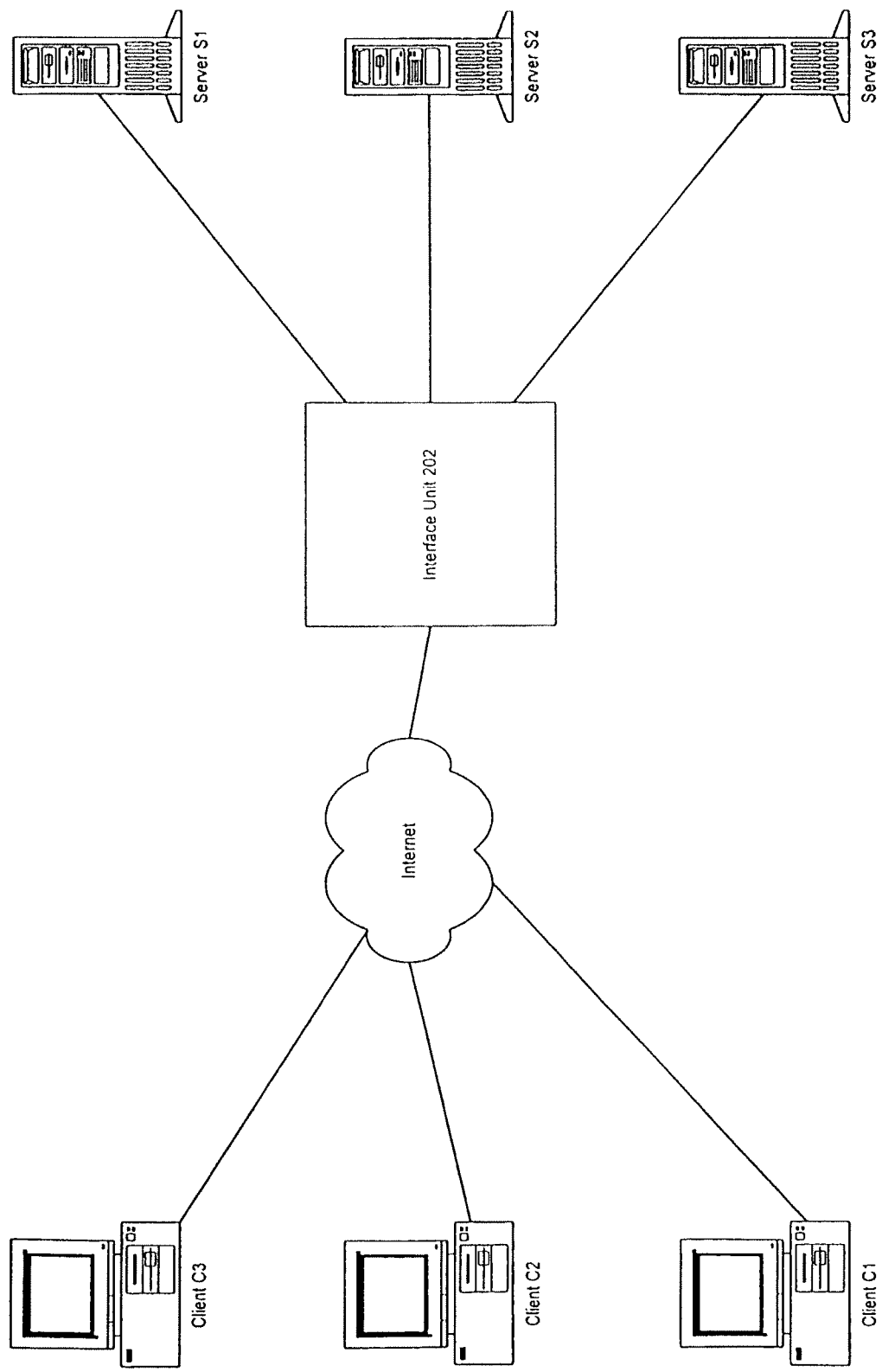
FIG. 2 is a network context diagram for an interface unit according to an embodiment of the present invention.

FIG. 2 is a network context diagram for interface unit 202 according to an embodiment of the present invention. In this embodiment, an interface unit is an intelligent network interface card with a CPU inside a server. An interface unit can also be an intelligent box sitting outside the server, in which case it can serve more than one server. Interface unit 202 can also be a load balancer, bandwidth manager, firewall, router, switch, computer system, or any other network device that is located between a client and server.

Referring to FIG. 2, a plurality of clients C1, C2, C3 are coupled to the Internet and a plurality of servers S1, S2, S3, are coupled to the Internet by interface unit 202. Servers S1, S2, S3 are collectively referred to as a "server farm". All Internet traffic with the server farm passes through interface unit 202. While the present invention is described in terms of the Internet, the concepts described also apply to other types of networks, as will be apparent to one skilled in the relevant art.

As described in detail in the commonly-owned, U.S. patent application Ser. No. 09/188,709, filed Nov. 10, 1998, entitled, "Internet Client-Server Multiplexer," interface unit 202 relieves servers S1, S2, S3 of much of the processing load caused by repeatedly opening and closing connections to clients by opening one or more connections with each server and maintaining these connections to allow repeated data accesses by clients via the Internet. This technique is referred to herein as "connection pooling".

For completeness, the operation of connection pooling is briefly described next with reference to FIG. 3. The process begins in FIG. 3 when a client requests access to one of the servers in the server farm tended by interface unit 202, A connection is opened between interface unit 202 and the requesting client, and interface unit 202 receives the client request to access the server, as shown in step 302. Interface unit 202 determines the identity of the requested server as shown in step 304, In one embodiment, this is accomplished by examining the destination network address specified by the client request. In another embodiment, this is accomplished by examining the network address and path name specified by the client request.

After determining the identity of the server to which the client request should be directed, interface unit 202 determines whether a free connection (that is, one that is not in use) to the server is already open, as shown in step 306. If so, processing resumes at step 310. If not, interface unit 202 opens a connection to the server, as shown in step 308. Interface unit 202 then translates the client request and passes it to the server, as shown in step 310, and as more fully described with respect to FIG. 4, below. After server processing, interface unit receives a response from the server, as shown in step 312. The server response is translated and passed to the requesting client, as shown in step 314 and described further below. Finally, interface unit 202 closes the connection with the client as shown in step 316. However, the connection between interface unit 202 and server is not disconnected. By maintaining open connections with the servers and by opening and closing connections with the client as needed, interface unit 202 frees the servers of nearly all of the connection loading problems associated with serving clients over the Internet.

As will be discussed further below, the present invention is related to step 316, where interface unit 202 closes the connection with the client. There are a number of scenarios that result in interface unit 202 closing the connection with the client. For example, the client may initiate a FIN (finish) command or a RST (reset) command. In both of these scenarios, interface unit 202 waits until it receives one of these commands before it loses the connection between itself and the client. Inefficiencies with connection pooling occur when the client is not using or finished with the connection but does not relay this information to interface unit 202 for a period of time. Because interface unit 202 is waiting for a command from the client in order to reuse the connection for another client, the connection is tied up unnecessarily.

As will be explained in more detail below, Hyper-Text Transfer Protocol (HTTP) 1.1 (by default) and HTTP 1.0 (with the Connection: Keep-Alive Technique, as described in detail in U.S. patent application Ser. No. 09/188,709) enable the client and/or interface unit 202 to keep the connection open with the server even after receiving a server response to a request. The client and/or interface unit 202 may then issue other requests via the same connection, either immediately or after considerable time (or "think time"). A client is in "think time" when the human operator of the client is deciding the next link on the browser to click, and so forth This can result in connections being maintained by the server even though the server is not processing any requests via the connections, Here, server administrators may be forced to guard against too many simultaneous connections on the server by setting a Keep-Alive timeout after which the connection which has been idle or in "think time" is closed. The present invention allows the connection to the server to be used by client 2 while the client 1 is "thinking". Of course, if client 2 makes a request when client 1 is using the server connection, then client 2 must use a different connection to the server. However, the efficiency of the connection pooling of the present invention is realized when a very small number of connections is exceeded and moves into the general case. The general case being when 'n' client connections may be statistically multiplexed onto server connections, where 'n' is greater than 'm'

Figure 3:
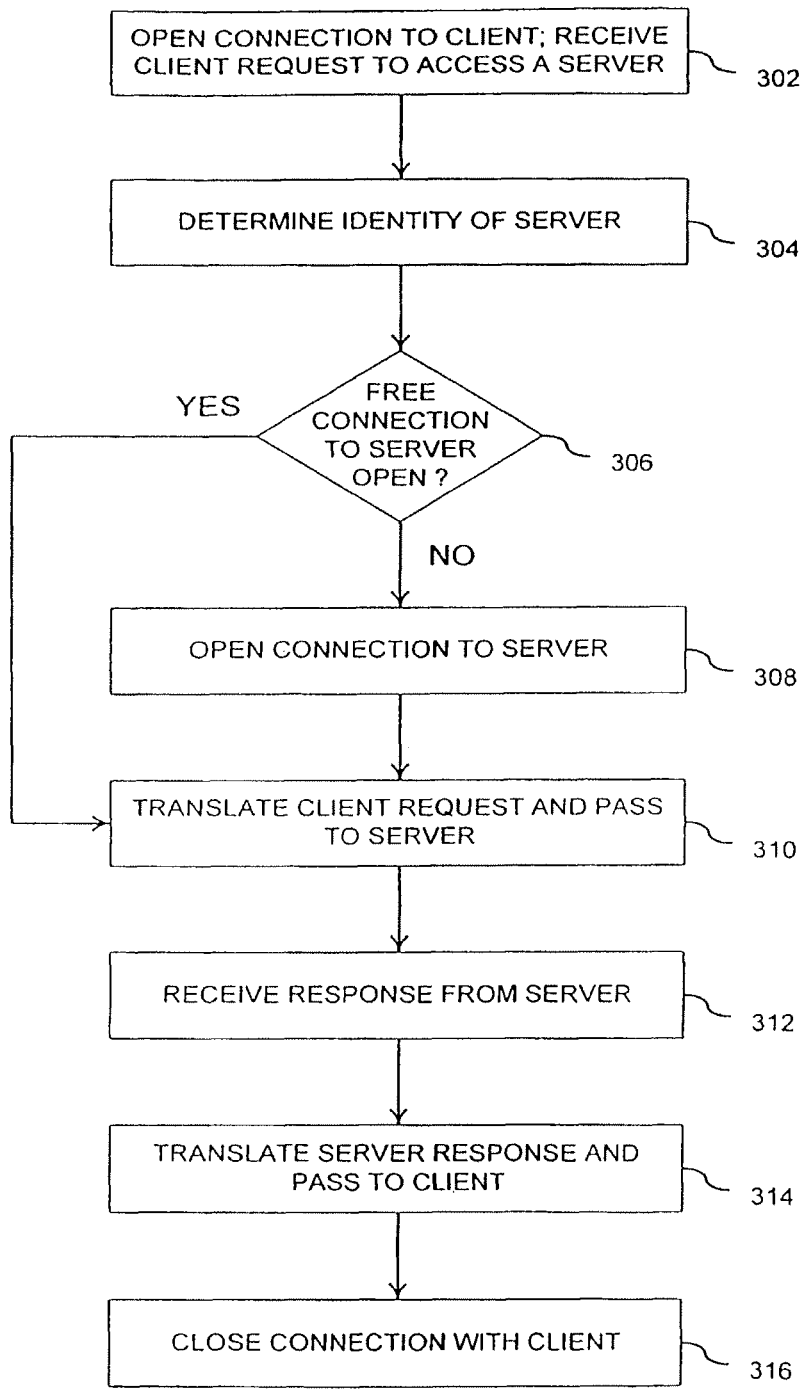
FIG. 3 is a flowchart illustrating the operation of the connection pooling aspect of the present invention according to an embodiment of the present invention.
Figure 4:
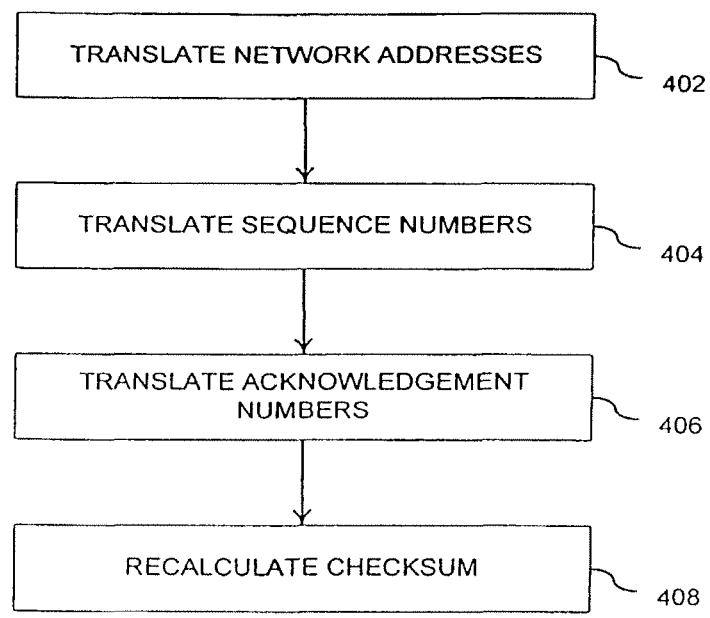
FIG. 4 is a flowchart depicting the operation of the present invention in translating client and server requests according to an embodiment of the present invention.

FIG. 4 is a flowchart depicting the operation of the present invention in translating client and server requests, as shown in steps 310 and 314 (FIG. 3). In an embodiment, the message traffic is in the form of TCP/IP packets, a protocol suite that is well-known in the art. The TCP/IP protocol suite supports many applications, such as Telnet, File Transfer Protocol (FTP), e-mail, and HTTP. The present invention is described in terms of the HTTP protocol, However, the concepts of the present invention apply equally well to other TCP/IP applications, as will be apparent to one skilled in the art after reading this specification.

Each TCP packet includes a TCP header and an IP header, The IP header includes a 32-bit source IP address and a 32-bit destination IP address. The TCP header includes a 16-bit source port number and a 16-bit destination port number The source IP address and port number, collectively referred to as the source network address, uniquely identify the source interface of the packet. Likewise, the destination IP address and port number, collectively referred to as the destination network address, uniquely identify the destination interface for the packet The source and destination network addresses of the packet uniquely identify a connection. The TCP header also includes a 32-bit sequence number and a 32-bit acknowledgment number, The TCP portion of the packet is referred to as a TCP segment. A TCP segment includes a TCP header and body. The body part of the TCP segment includes a HTTP header and the message. There are two mechanisms for determining the length of the message, including one based on chunked transfer encoding and another based on content-length. A content-length header file is found in the HTTP header If a content-length header field is present, its value in bytes represents the length of the message-body. Alternatively, if a chunked transfer encoding header is present in the HTTP header, and indicates that the "chunked" transfer coding has been applied, then the length of the message is defined by the chunked encoding. The chunked encoding modifies the body of a message in order to transfer the message as a series of chunks, each with its own indicator contained in the chunk-size field.

As will be discussed in detail below, the present invention utilizes the content-length parameter and/or the chunked transfer encoding header to increase the efficiency of connection pooling between servers and clients by avoiding the situation where the client is in "think time". Without the present invention, interface unit 202 either waits for a command from the client before it reuses the connection for another client or the connection times out when the connection has been idle for too long.

The 32-bit sequence number, mentioned above, identifies the byte in the string of data from the sending TCP to the receiving TCP that the first byte of data in the TCP segment represents. Since every byte that is exchanged is numbered, the acknowledgment number contains the next sequence number that the sender of the acknowledgment expects to receive. This is therefore the sequence number plus one of the last successfully received bytes of data. The checksum covers the TCP segment, i.e., the TCP header and the response data (or body). This is a mandatory field that must be calculated and stored by the sender, and then verified by the receiver.

In order to successfully route an inbound packet from a client to the intended server, or to route an outbound packet from a server to a client, interface unit 202 employs a process known as "network address translation Network address translation is well-known in the art, and is specified by request for comments (RFC) 1631, which can be found at the URL http://www.safety.net/RFC1631.txt.

However, in order to seamlessly splice the client and server connections, a novel translation technique was described in detail in the commonly-owned, U.S. patent application Ser. No. 09/188,709, filed Nov. 10, 1998, entitled, "Internet Client-Server Multiplexer," referred to herein as "connection multiplexing" According to this technique, a packet is translated by modifying its sequence number and acknowledgment number at the TCP protocol level. A significant advantage of this technique is that no application layer interaction is required.

Referring to FIG. 4, the network address of the packet is translated, as shown in step 402. In the case of an in-bound packet (that is, a packet received from a client), the source network address of the packet is changed to that of an output port of interface unit 202, and the destination network address is changed to that of the intended server. In the case of an outbound packet (that is, one received from a server), the source network address is changed from that of the server to that of an output port of interface unit 202, and the destination address is changed from that of interface unit 202 to that of the requesting client. The sequence numbers and acknowledgment numbers of the packet are also translated, as shown in steps 404 and 406 and described in detail below. Finally, the packet checksum is recalculated to account for these translations, as shown in step 408.

As mentioned above, the present invention is related specifically to an apparatus, method and computer program product for efficiently pooling network client-server connections though the content-length parameter and/or the chunked transfer encoding header to increase the efficiency of connection pooling between servers and clients. The increase in efficiency is the result of avoiding occupying the connection while the client is in "think time", In one embodiment of the present invention, the content length parameters is used to determine the length of the message. In another embodiment of the present invention, chunked transfer encoding is used to determine the length of the message. The two embodiments of the present invention will be described next with reference to FIGS. 5 and 6, respectively.

Figure 5:
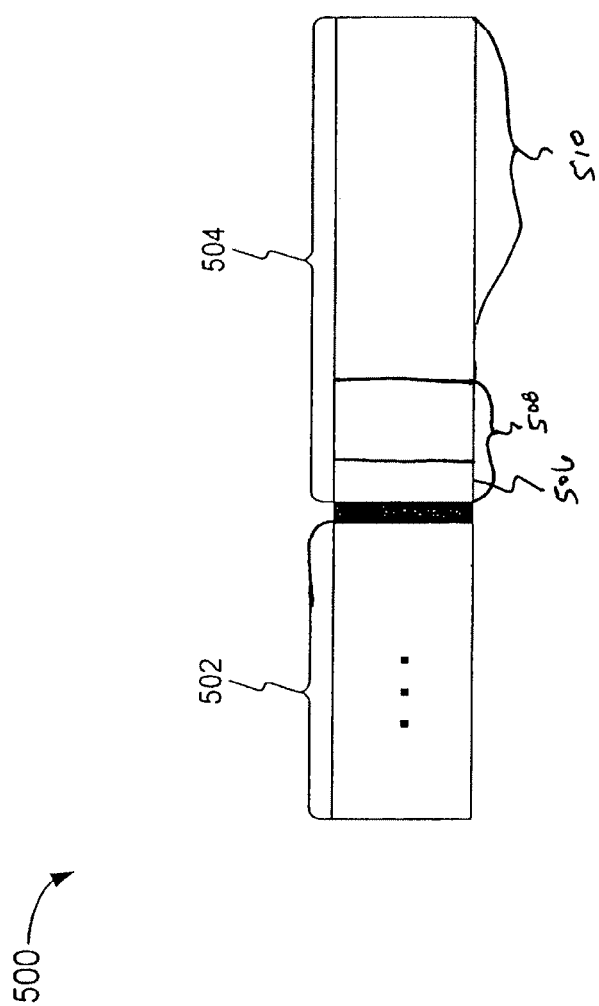
FIG. 5 illustrates a content length parameter according to an embodiment of the present invention.

FIG. 5 illustrates the TCP portion of a TCP packet called the TCP segment 500. The TCP segment 500 includes a TCP header 502 and a body 504_ The body 504 contains, among other information, a HTTP header and the message. A content length parameter 506 is found in the HTTP header. How the present invention utilizes the content length parameter 506 to provide more efficient connection pooling is described below with reference to FIGS. 8 and 9.

Figure 6:
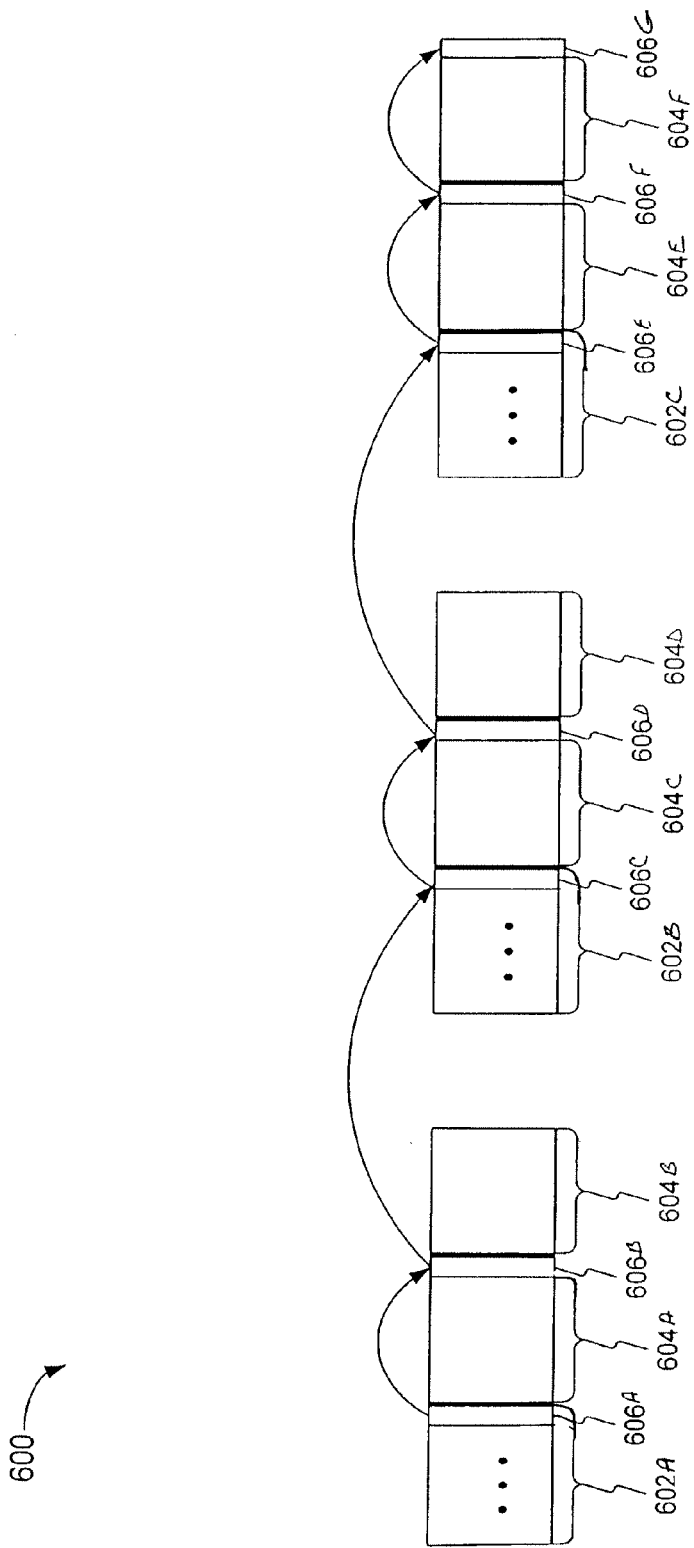
FIG. 6 illustrates chunk-size fields according to an embodiment of the present invention.

FIG. 6 illustrates the TCP portion of a TCP packet called the TCP segment 600. As stated above, if a chunked transfer encoding header is present in the HTTP header, and indicates that the "chunked" transfer encoding has been applied, then the length of the message is defined by the chunked encoding, The chunked encoding modifies the body of a message in order to transfer the message as a series of chunks, each with its own indicator contained in the chunk-size field. The TCP segment 600 includes a TCP header (not shown) and a body. The body contains, among other information, a HTTP header 602A-602C and the message. HTTP header 602A-602C is comprised of seven chunk-size fields 606A-606G; and six chunk message data 604A-604F.

The chunk-size fields 606A-606G are linked together, as illustrated in FIG. 6. The chunk-size field 606A indicates the length of the message in the chunk message data 604A, chunk-size field 606C indicates the length of the message in the chunk message data 604C, and so forth The last chunk-size field 606G always contains the length value zero indicating that there is no more message data to follow. This is an indication to the present invention that all of the message has been sent to the client. How the present invention utilizes the chunk-size fields 606A-606G to provide more efficient connection pooling is described below with reference to FIGS. 10 and 11. It is important to note that TCP segment 600 in FIG. 6 is for illustration purposes only and does not limit the present invention.

Figure 7:
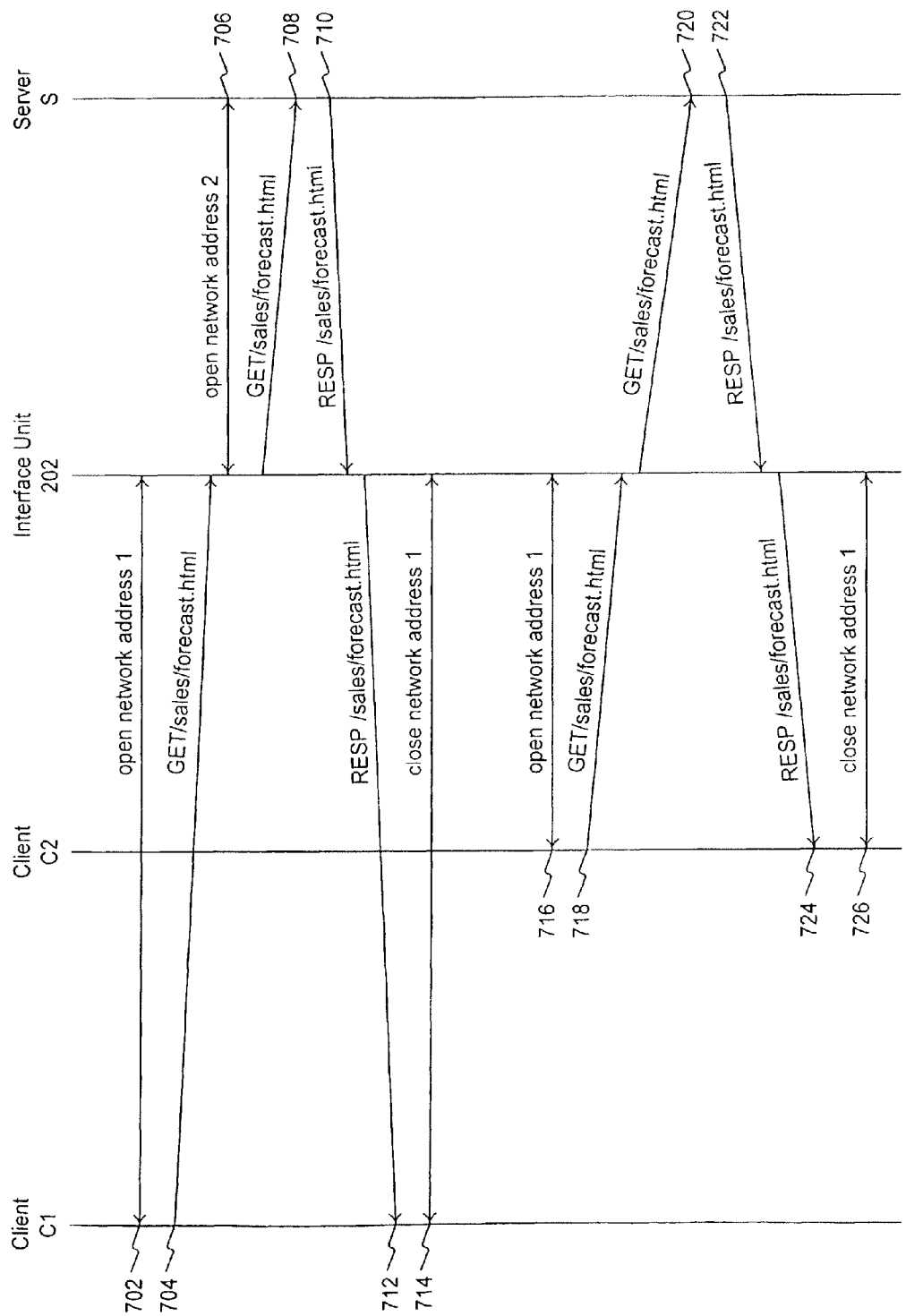
FIG. 7 is a message flow diagram illustrating the connection pooling aspect of the present invention according to an embodiment of the present invention.

Prior to describing the detail of how the present invention utilizes the content length parameter to increase the efficiency of connection pooling, connection pooling as it is described in U.S. patent application Ser. No. 09/188,709, filed Nov. 10, 1998, entitled, "Internet Client-Server Multiplexer," will first be discussed for completeness. FIG. 7 is a message flow diagram illustrating connection pooling. FIG. 7 shows interface unit 202 connecting two clients, C1 and C2, to a server S. First, interface unit 202 opens a connection with client C1 using network address 1 provided by client C1 as shown by flow 702 Flow line 702 is shown as a two-way flow because the TCP/IP protocol employs a multi-stage handshake to open connections.

Once the connection is opened, interface unit 202 receives a GET request from client C1 specifying a path name of /sales/forecast.html, as shown by flow line 704. Because no free connection is open between interface unit 202 and server S, interface unit 202 opens a connection with server S. Interface unit 202 maps this request to network address 2, which specifies server S, as shown by flow line 706. Interface unit 202 also passes the GET request to that server, as shown by flow line 708. Server S responds with the requested web page, as shown by flow line 710, Interface unit 202 forwards the web page to client C1, as shown by flow line 712. Finally, the connection between client C1 and interface unit 202 is closed, as shown by flow line 714. According to the TCP/IP protocol, closing a network connection can involve a multi-stage process. Therefore, flow line 714 is shown as bidirectional, It is important to note that interface unit 202 does not close the connection with server S, but rather keeps it open to accommodate further data flows.

Next, a connection is opened between interface unit 202 and client C2 using network address 1 provided by client C2, as shown by flow line 716, Next, interface unit 202 receives a GET request from client C2 specifying the Web page /sales/forecast.html, as shown by flow line 718. Because a free connection is already open between interface unit 202 and server S, it is unnecessary for interface unit 202 to burden server S with the processing load of opening a further connection. Interface unit 202 merely uses a free open connection. Interface unit 202 maps the GET request to server S, transfers it, and forwards it to server S, as shown by flow line 720. Interface unit 202 receives the response from server S, as shown by flow line 722, and forwards it to client C2 as shown by flow line 724. Finally, interface unit 202 closes the connection with client C2, as shown in flow line 726. Once again, interface unit 202 does not close the connection with server S. Instead, interface unit 202 keeps the connection open to accommodate further data flows.

As discussed above, there are a number of scenarios that result in interface unit 202 closing the connection with client C2, as shown in flow line 724. For example, the client may initiate a FIN (finish) command, which occurs once the client has retrieved all requested data (or message). The client may also initiate a RST (reset) command. In addition to closing the connection between interface unit 202 and the client, the RST command results in a number of housekeeping operations being performed to keep the server side connection in good order, In particular, the TCP protocol guarantees that the RST command will have the right SEQ (sequence) number so that the server will accept the TCP segment; however, the RST command is not guaranteed to have the right ACK (acknowledge) number, To take care of this scenario, interface unit 202 keeps track of the bytes of data sent by the server and the bytes acknowledged by the client. If the client has not yet acknowledged all the data by the server, interface unit 202 calculates the unacknowledged bytes, and sends an ACK to the server. Furthermore, the server side PCB may be placed on a timeout queue to allow any pending server data transfers to drain.

Furthermore, although not shown in FIG. 7, the server can also close a connection between itself and interface unit 202. The server would send a FIN command to interface unit 202. In this case, both the connection between the server and interface unit 202 and the connection between interface unit 202 and client will be closed.

Another aspect of the invention is to maximize offload of connection processing from the server by minimizing the occasions on which the server closes the connection. There are three cases:

(1) The protocol version HTTP/1.1 is used. In this case, no explicit Keep-Alive header is required. By default, the server keeps the connection open; it is up to the client to close the connection. The present invention offloads the server by reusing the server side connection, Because it is up to the client to close the connection, inefficiencies with connection pooling occur when the client is finished with the connection but does not relay this information to interface unit 202 for a period of time. Because interface unit 202 is waiting for a command from the client in order to reuse the connection for another client, the connection is tied up unnecessarily, (2) The protocol version HTTP/1.0 is used and the "Connection: Keep-Alive" header is provided by the client. In this case, the server keeps the connection open; it is up to the client to close the connection. The present invention offloads the server by reusing the server side connection. As with protocol version HTTP/1.1, inefficiencies with connection pooling occur when the client is finished with the connection but does not relay this information to interface unit 202 for a period of time.

(3) The protocol version HTTP/1.0 is used and the "Connection: Keep-Alive" header is not provided by the client. In this case, the server will normally (without the present invention) close the connection after fully satisfying one GET request. If the server closes the connection after each request this denies that interface unit 202 the opportunity to reuse the server side connection As it turns out much of the Internet still uses HTTP/1.0 without "Connection: Keep Alive" A novel technique for allowing the reuse of server side connections in this specific, important case was described in detail in the commonly-owned, U.S. patent application Ser. No. 09/188, 709, filed Nov. 10, 1998, entitled, "Internet Client-Server Multiplexer", Interface unit 202 inspects the GET packet to detect this situation When this case is detected, interface unit 202 inserts "Connection: Keep-Alive" into the GET packet. Since this is done invisibly to the client, interface unit 202 must keep track of the number of "Bytes Added" on the server side connection. The "Bytes Added" does not affect the Sequence numbers in the GET packet since the sequence number is that of the first byte, However, interface unit 202 must add "Bytes Added" to the sequence number of subsequent packets from the client to the server. Conversely, the server will acknowledge the additional bytes, but interface unit 202 must subtract them before sending the acknowledgment to the client—which does not know that these bytes were added.

Figure 8:
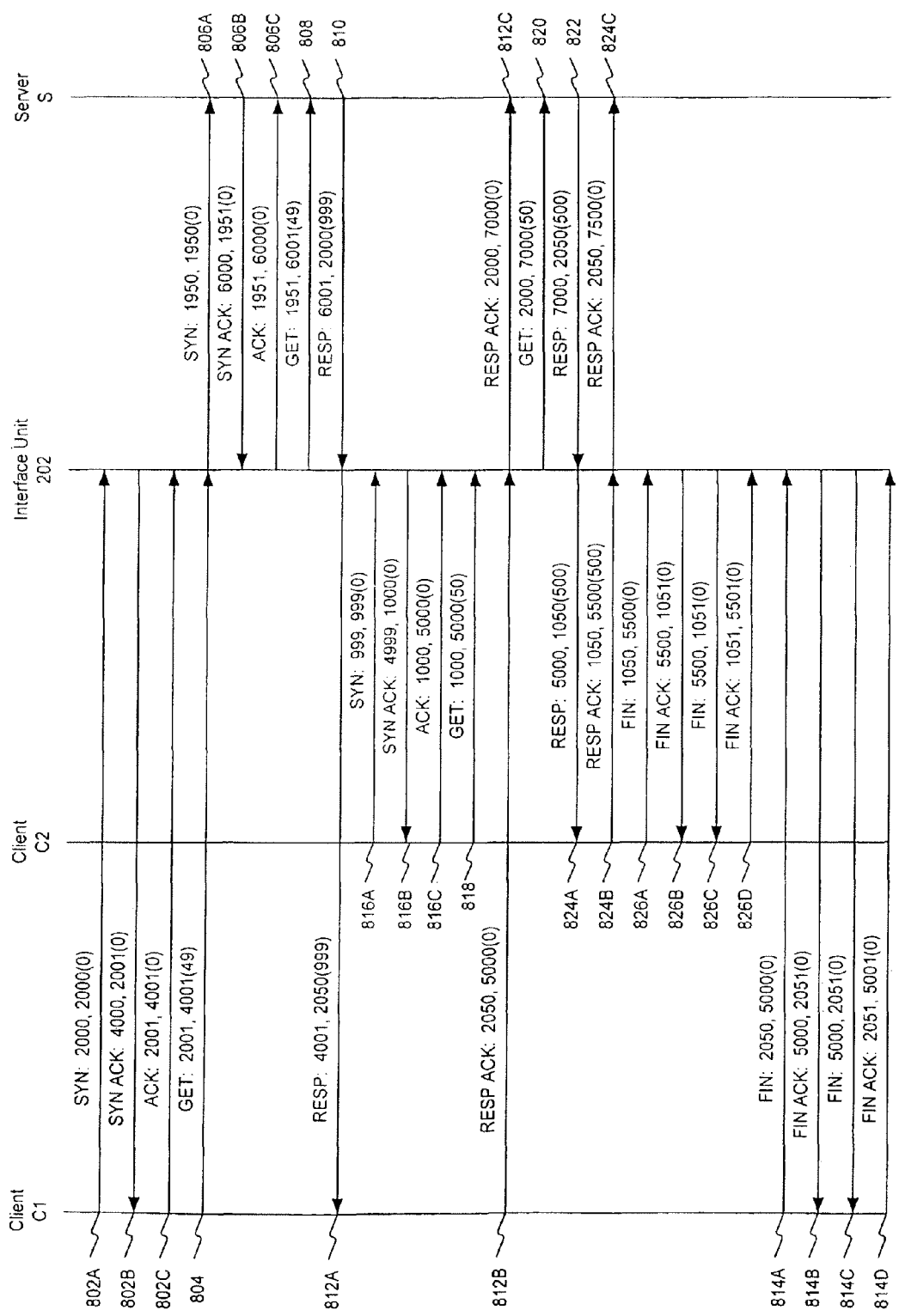
FIG. 8 is a detailed flow diagram illustrating the use of the content length parameter to increase the efficiency of the pooling of connections between clients and servers according to an embodiment of the present invention.
Figure 9:
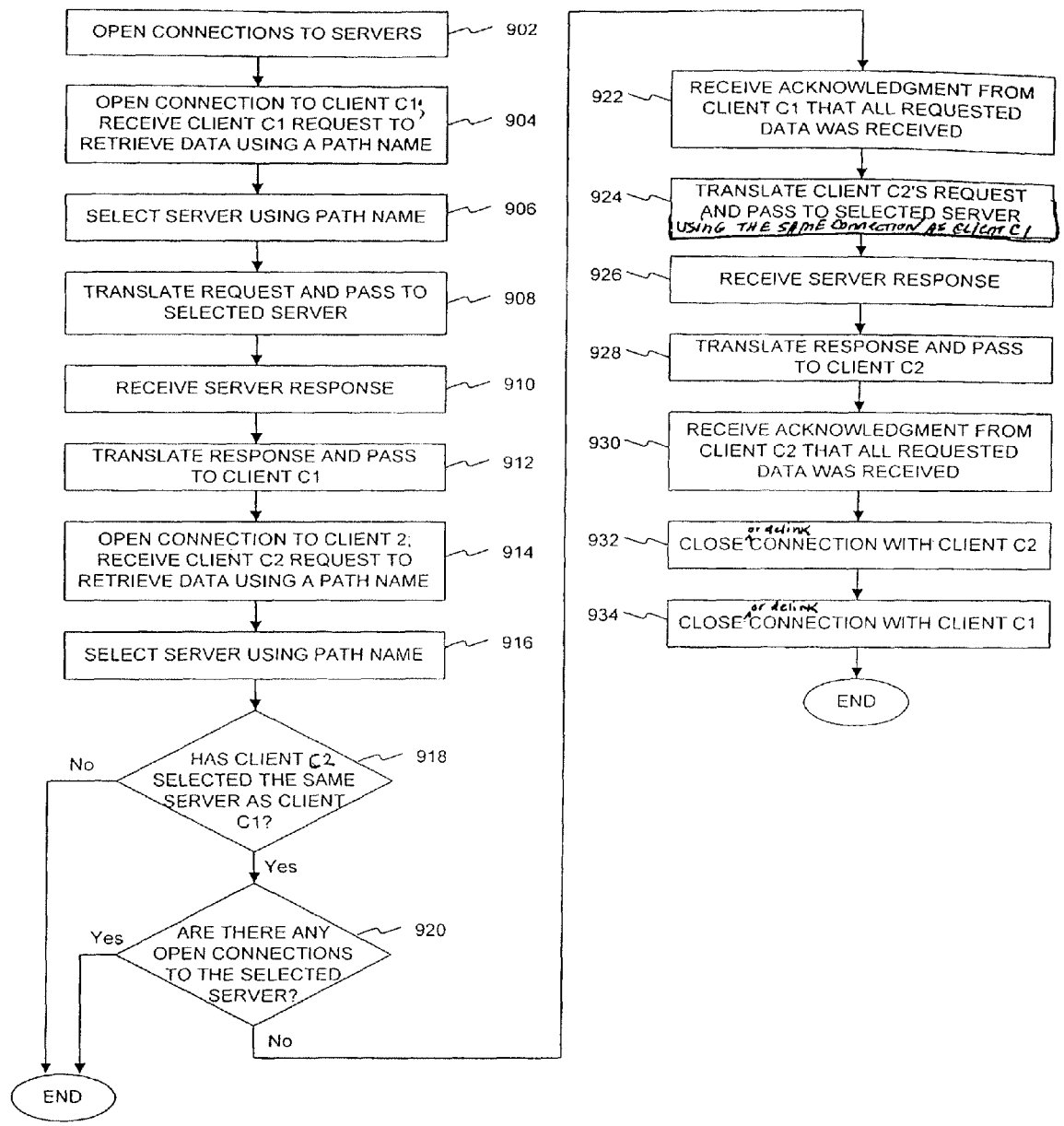
FIG. 9 is a flowchart depicting the operation of the use of the content length parameter to increase the efficiency of the pooling of connections between clients and servers according to an embodiment of the present invention.
Figure 10:
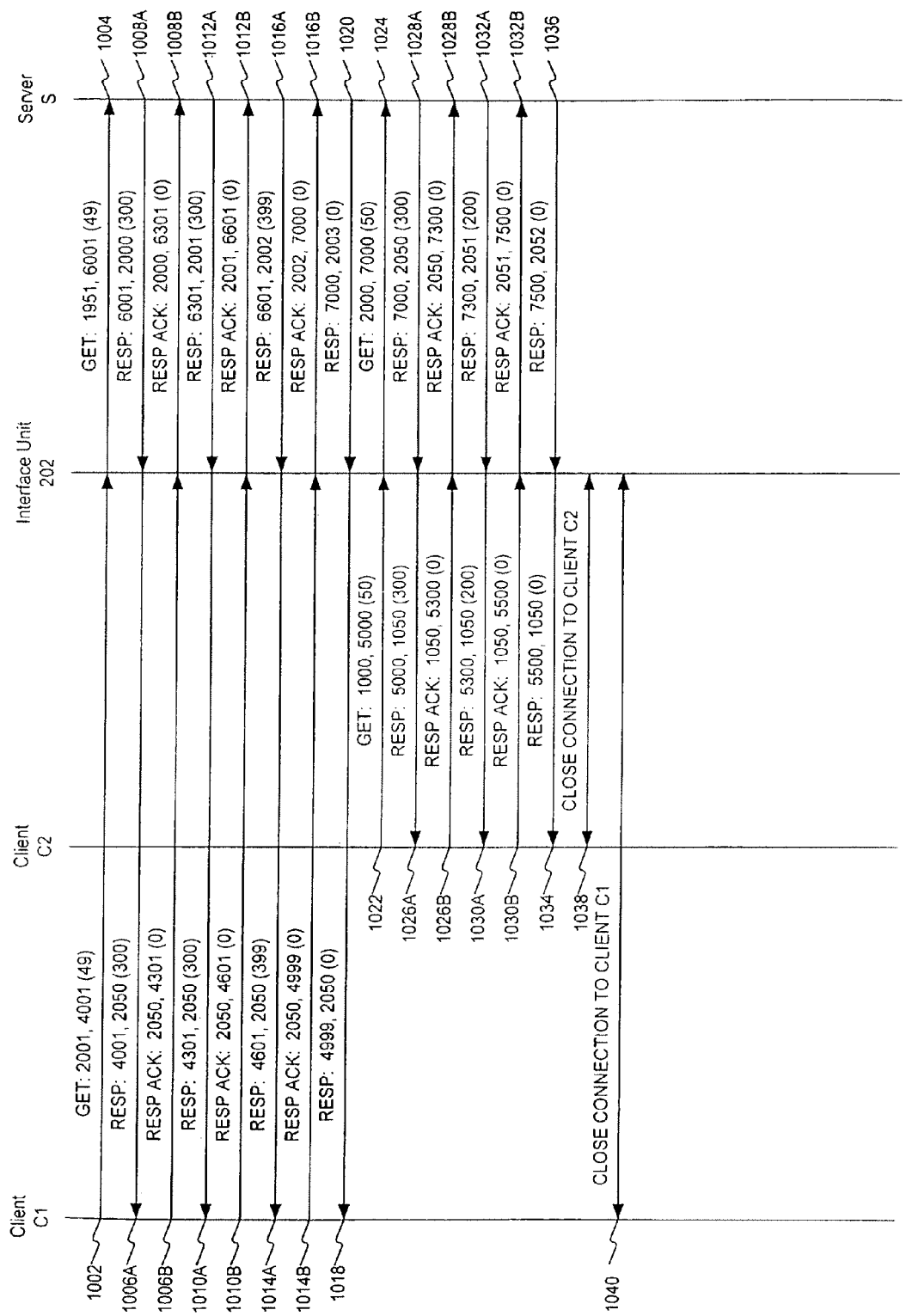
FIG. 10 is a detailed flow diagram illustrating the use of chunk-size fields to increase the efficiency of the pooling of connections between clients and servers according to an embodiment of the present invention.
Figure 11:
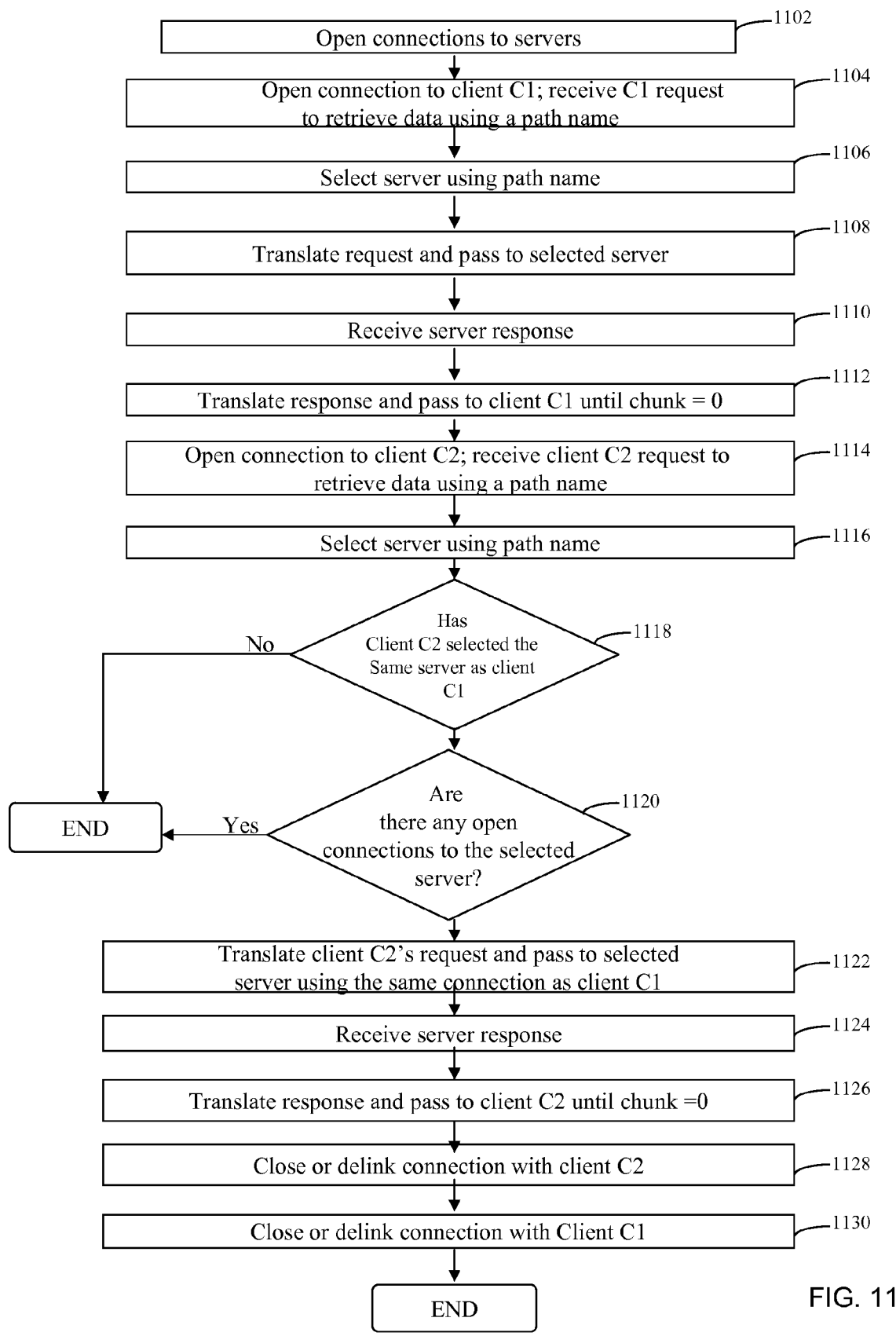
FIG. 11 is a flowchart depicting the operation of the use of chunk-size fields to increase the efficiency of the pooling of connections between clients and servers according to an embodiment of the present invention.

As mentioned above, connection multiplexing is achieved by manipulating sequence and acknowledgment numbers_ Sequence and acknowledgment numbers of segments received by interface unit 202 are modified and mapped to values expected by the recipient. To the client, data appears to be coming from the server and vice versa. For example if "Inflow" denotes a segment received by interface unit 202 and "Outflow" denotes the corresponding outbound segment, the sequence and acknowledge numbers are changed in the following manner:

> Outflow sequence number=Inflow sequence number− Inflow starting sequence number+Outflow starting sequence number > Outflow acknowledge number=Inflow acknowledge number−Inflow starting acknowledge number+ Outflow starting acknowledge number To address the addition of the "Connection: Keep Alive" header for HTTP/1.0 packets, interface unit 202 keeps track of "Bytes Added" on the appropriate half of the connection— in this case the server side. The sequence number and acknowledgment number formulas are changed as follows:

> Outflow sequence number=Inflow sequence number− Inflow starting sequence number+Outflow starting sequence number+Outflow Bytes Added > Outflow acknowledge number=Inflow acknowledge number−Inflow starting acknowledge number+ Outflow starting acknowledge number−Inflow Bytes Added Specific examples of translations accomplished using these equations while incorporating the content length parameter technique of the present invention to provide more efficient connection pooling is described below with reference to FIGS. 8 and 9 (relating to content length parameter) and FIGS. 10 and 11 (relating to chunk-size fields).

FIG. 8 is a detailed flow diagram illustrating the translations of acknowledgment and sequence numbers performed by the present invention while incorporating the content length parameter technique. The label for each flow in FIG. 8 is of the form T:S,A(L), where T represents a TCP segment type, S is the sequence number, A is the acknowledgment number, and L is the content length parameter. The content length parameter describes the number of bytes of data in the message.

Flows 802A-802C present one method of opening the connection between client C1 and interface unit 202. Each flow represents a TCP segment. In TCP segment 802A, the SYN flag in the TCP header is set, indicating a new connection request from client C1. Client C1 has established a starting sequence number of 2000 and an acknowledgment number of 2000. Interface unit 202 responds with a SYN ACK segment specifying a starting sequence number of 4000, and incrementing the acknowledgment number to 2001, as shown by flow 802B. Each entity (e.g., client, server, interface unit) within the network sets its own unique sequence number and/or acknowledgment number, as is well known in the art. Client C1 responds with an ACK segment specifying a sequence number of 2001 and incrementing the acknowledgment number to 4001, as shown by flow 802C Client C1 then sends a GET segment specifying a length of 49 bytes, as shown by flow 804.

Assume that interface unit 202 determines that no free open connections exist with server S and therefore sends a SYN segment to server S, specifying a starting sequence number of 1950, as shown in flow 806A. Server S responds with a SYN ACK segment specifying a starting sequence number of 6000 and incrementing the acknowledgment number to 1951, as shown in 806B. Interface unit 202 responds with an ACK segment, as shown by flow 806C. Interface unit 202 then forwards the GET segment from client C1 to server S, after modifying the sequence and acknowledgment numbers according to the translation equations described above, as shown by flow line 808.

Server S responds with the requested data specifying a sequence number of 6001, an acknowledgment number of 2000, and a content length parameter of 999, as shown by flow 810. Interface unit 202 receives the RESP segment, translates the sequence and acknowledgment numbers, and forwards the RESP segment to client C1, as shown by flow line 812A.

At this point, interface unit 202 receives a request by client C2 to open a connection. As above, flows 816A-816C present one method of opening the connection between client C2 and interface unit 202. Again, each flow represents a TCP segment, In TCP segment 816A, the SYN flag in the TCP header is set, indicating a new connection request from client C2. Client C2 has established a starting sequence number of 999 and an acknowledgment number of 999. Interface unit 202 responds with a SYN ACK segment specifying a starting sequence number of 4999, and incrementing the acknowledgment number to 1000, as shown by flow 816B. Client C2 responds with an ACK segment specifying a sequence number of 1000 and incrementing the acknowledgment number to 5000, as shown by flow 816C. Client C2 then sends a GET segment specifying a length of 50 bytes, as shown by flow 818.

Assume at this point that interface unit 202 has no available connections to server S. The goal is to reuse the same connection to server S that was previous used for client C1 if client C1 is finished with the connection or is in "think time". Instead of waiting for client C1 to initiate a FIN (finish) command or a RST (reset) command to free up the connection, interface unit 202 uses the content length parameter to confirm that all of the requested data has been received by client C1. Here, at flow 812B, interface unit 202 receives confirmation from client C1 that client C1 has in fact received all of the requested data. This indicates to interface unit 202 that, even though client C1 may be pausing for some reason before it sends a FIN or RST command, client C1 is finished with the connection. Interface unit 202 modifies the acknowledgment and sequence numbers and forwards the RESP ACK segment to server S, as shown by flow 812C.

Using the same connection as used with client C1, interface unit 202 then forwards the GET segment from client C2 to server S, after modifying the sequence and acknowledgment numbers according to the translation equations described above, as shown by flow line 820. Server S responds with the requested data specifying a sequence number of 7000, an acknowledgment number of 2050, and a content length parameter of 500, as shown by flow 822.

Interface unit 202 receives the RESP segment, translates the sequence and acknowledgment numbers, and forwards the RESP segment to client C2, as shown by flow line 824A. Here, at flow 824B, interface unit 202 gets confirmation from client C2 that client C2 has in fact received all of the requested data. Interface unit 202 modifies the acknowledgment and sequence numbers and forwards the RESP ACK segment to server S, as shown by flow 824C.

The connection between client C2 and interface unit 202 is then closed or delinked once interface unit 202 receives a FIN or RST command from client C2, as shown by flows 826A-826D. Likewise, the connection between client C1 and interface unit 202 is then closed or delinked once it receives a FIN or RST command from client C1, as shown by flows 814A-814D. It is important to note, however, that interface unit 202 maintains the connection with server S. It is also important to note that the sequence of events as they were described with reference to FIG. 8 is for illustration purposes only and does not limit the present invention.

FIG. 9 is a flowchart depicting the operation of the use of the content length parameter to increase the efficiency of the pooling of connections between clients and servers according to an embodiment of the present invention. Interface unit 202 maintains connections with a plurality of servers, and routes client requests to these servers based on the path name specified in the client request. First, interface unit 202 opens connections with the servers, as shown in step 902. Next, in response to a client C1 request, interface unit 202 opens a connection to client C1 and receives a request from client C1 to retrieve data using a path name, as shown in step 904.

Interface unit 202 then selects the server hosting the content specified by the path name, as shown in step 906. In alternative embodiments, interface unit 202 consults other predefined policies to select the appropriate server, such as the load of the servers and the state of the servers. Interface unit 202 manages and maintains a database of servers and server farms that it tends. Among other things, information in this database includes currently active policies and rules that allow interface unit 202 to direct incoming packets to the correct server. Depending on network conditions and services desired, these policies and rules can change very quickly.

Interface unit 202 then translates the request and passes the translated request to the selected server, as shown in step 908. Interface unit 202 receives the response from server S, as shown in step 910. Interface unit 202 then translates the response and passes the translated response on to client C1, as shown in step 912.

Assume for illustration purposes that at this point interface unit 202 receives a request from client C2 to retrieve data. Interface unit 202, in response to the client C2 request, opens a connection to client C2 and receives a request from client C2 to retrieve data using a path name, as shown in step 914. Interface unit 202 then selects the server hosting the content specified by the path name, as shown in step 916.

In step 918, interface unit 202 determines whether client C2 has selected the same server as client C1. If the outcome to step 918 is negative, then interface unit 202 proceeds in a fashion necessary to satisfy client C2's request (which is not important to the present invention). At this point the flowchart in FIG. 9 ends. Alternatively, if the outcome to step 918 is positive, then interface unit 202 determines whether there are any open connections to the selected server, as shown in step 920.

If the outcome to step 920 is positive, then interface unit 202 proceeds in a fashion necessary to satisfy client C2's request (which is not important to the present invention). At this point the flowchart in FIG. 9 ends. Alternatively, if the outcome to step 920 is negative, then interface unit 202 utilizes the content length parameter to confirm that client C1 received all of the data that client C1 requested, as shown in step 922. It is important to note that interface unit 202 does not wait for client C1 to send a FIN or RST command in order to determine that client C is finished with the connection or is in "think time". This allows for more efficient connection pooling due to the fact that interface unit 202 can utilize each connection quicker than if interface unit 202 waited for the client to close the connection prior to reusing the connection for another client.

In step 924, interface unit 202 then translates the request and passes the translated request to the selected server using the same connection as client C1 used, as shown in step 924. Interface unit 202 receives the response from server S, as shown in step 926. Interface unit 202 then translates the response and passes the translated response on to client C2, as shown in step 928, Interface unit 202 utilizes the content length parameter to confirm that client C2 received all of the data that client C2 requested, as shown in step 930.

Next, interface unit 202 closes or delinks the connection with client C2 in step 932. Finally, interface unit 202 closes or delinks the connection with client C1 in step 934, and the flowchart in FIG. 9 ends. As stated above with reference to FIG. 8, the sequence of events as they were described with reference to FIG. 9 is for illustration purposes only and does not limit the present invention.

FIG. 10 is a detailed flow diagram illustrating the translations of acknowledgment and sequence numbers performed by the present invention while incorporating the chunk-size fields technique. The label for each flow in FIG. 10 is of the form T:S,A(L), where T represents a TCP segment type, S is the sequence number, A is the acknowledgment number, and L is a chunk-size field.

The total values of the chunk-size fields describes the number of bytes of data in the TCP segment.

For simplicity, we assume that connections to both client C1 and client C2 have already been established. Client C1 then sends a GET segment specifying a length of 49 bytes, as shown by flow 1002. Interface unit 202 determines that no free open connections exist with server S and therefore opens a connection with server S (not shown in FIG. 10). Interface unit 202 then forwards the GET segment from client C1 to server S, after modifying the sequence and acknowledgment numbers according to the translation equations described above, as shown by flow line 1004.

For illustration purposes, assume that the data in the response segment has a total content data length of 999. Further assume that the data will be transmitted in two 300 data chunks and one 399 data chunk Note that this is for illustration purposes only and is not intended to limit the present invention. Therefore, the server S first responds with a chunk of the requested data (or message) specifying a sequence number of 6001, an acknowledgment number of 2000, and a chunk-size field of 300, as shown by flow 1008A. Interface unit 202 receives the RESP segment, translates the sequence and acknowledgment numbers, and forwards the RESP segment to client C1, as shown by flow line 1006A. Client C1 acknowledges receipt of the data to interface unit 202, as shown by flow line 1006B. Interface unit 202 in return passes this acknowledgment on to server S, as shown by flow line 1008B.

Server S next responds with the second chunk of the requested data specifying a sequence number of 6301, an acknowledgment number of 2001, and a chunk-size field of 300, as shown by flow 1012A. Interface unit 202 receives the RESP segment, translates the sequence and acknowledgment numbers, and forwards the RESP segment to client C1, as shown by flow line 1010A Client C1 acknowledges receipt of the data to interface unit 202, as shown by flow line 1010B. Interface unit 202 in return passes this acknowledgment on to server S, as shown by flow line 101213.

Server S next responds with the third chunk of the requested data specifying a sequence number of 6601, an acknowledgment number of 2002, and a chunk-size field of 399, as shown by flow 1016A. Interface unit 202 receives the RESP segment, translates the sequence and acknowledgment numbers, and forwards the RESP segment to client C1, as shown by flow line 1014A. Client C1 acknowledges receipt of the data to interface unit 202, as shown by flow line 1014B. Interface unit 202 in return passes this acknowledgment on to server S, as shown by flow line 1016B.

Finally, server S responds with the final chunk of the zero data (indicated by a chunk-size field that equals zero) specifying a sequence number of 7000, an acknowledgment number of 2003, and a chunk-size field of 0, as shown by flow 1020. Interface unit 202 receives the RESP segment, translates the sequence and acknowledgment numbers, and forwards the RESP segment to client C1, as shown by flow line 1018. This indicates to interface unit 202 and client C1 that all of the requested data has been transmitted.

At this point, client C2 then sends a GET segment specifying a length of 50 bytes, as shown by flow 1022. Assume at this point that interface unit 202 has no available connections to server S. The goal is to reuse the same connection to server S that was previous used for client C1 if client C1 is finished with the connection or is in "think time". Instead of waiting for client C1 to initiate a FIN (finish) command or a RST (reset) command to free up the connection, the interface unit uses the chunk-size field that equaled zero to confirm that all of the requested data has been received by client C1. This indicates to interface unit 202 that, even though client C1 may be pausing for some reason before it sends a FIN or RST command, client C1 is finished with the connection. Interface unit 202 modifies the acknowledgment and sequence numbers and forwards the GET segment to server S, as shown by flow 1024.

For illustration purposes, assume that the data in the response segment has a total content data length of 500. Further assume that the data will be transmitted in one 300 data chunk and one 200 data chunk. Note that this is for illustration purposes only and is not intended to limit the present invention. Therefore, the server S first responds with a chunk of the requested data specifying a sequence number of 7000, an acknowledgment number of 2050, and a chunk-size field of 300, as shown by flow 1028A. Interface unit 202 receives the RESP segment, translates the sequence and acknowledgment numbers, and forwards the RESP segment to client C2, as shown by flow line 1026A. Client C2 acknowledges receipt of the data to interface unit 202, as shown by flow line 1026B. Interface unit 202 in return passes this acknowledgment on to server S, as shown by flow line 1028B.

Server S next responds with the second chunk of the requested data specifying a sequence number of 7300, an acknowledgment number of 2051, and a chunk-size field of 200, as shown by flow 1032A. Interface unit 202 receives the RESP segment, translates the sequence and acknowledgment numbers, and forwards the RESP segment to client C2, as shown by flow line 1030A. Client C2 acknowledges receipt of the data to interface unit 202, as shown by flow line 1030B. Interface unit 202 in return passes this information on to server S, as shown by flow line 1032B.

Finally, server S responds with the final chunk of the zero data (indicated by a chunk-size field that equals zero) specifying a sequence number of 7500, an acknowledgment number of 2052, and a chunk-size field of 0, as shown by flow 1036. Interface unit 202 receives the RESP segment, translates the sequence and acknowledgment numbers, and forwards the RESP segment to client C2, as shown by flow line 1034. This indicates to interface unit 202 and client C2 that all of the requested data has been transmitted.

The connection between client C2 and interface unit 202 is then closed or delinked once interface unit 202 receives a FIN or RST command from client C2, as shown by flow 1038. Likewise, the connection between client C1 and interface unit 202 is then closed or delinked once it receives a FIN or RST command from client C1, as shown by flow 1040. It is important to note, however, that interface unit 202 maintains the connection with server S It is also important to note that the sequence of events as they were described with reference to FIG. 10 is for illustration purposes only and does not limit the present invention.

FIG. 11 is a flowchart depicting the operation of the use of the chunk-size fields to increase the efficiency of the pooling of connections between clients and servers according to an embodiment of the present invention. Interface unit 202 maintains connections with a plurality of servers, and routes client requests to these servers based on the path name specified in the client request. First, interface unit 202 opens connections with the servers, as shown in step 1102. Next, in response to a client C1 request, interface unit 202 opens a connection to client C1 and receives a request from client C1 to retrieve data using a path name, as shown in step 1104.

Interface unit 202 then selects the server hosting the content specified by the path name, as shown in step 1106. Interface unit 202 then translates the request and passes the translated request to the selected server, as shown in step 1108 Interface unit 202 receives the response from server S, as shown in step 1110, Interface unit 202 then translates the response and passes the translated response on to client C1 until chunk-size field is equal to zero, as shown in step 1112.

Assume for illustration purposes that at this point interface unit 202 receives a request from client C2 to open a connection. Interface unit 202, in response to a client C2 request, opens a connection to client C2 and receives a request from client C2 to retrieve data using a path name, as shown in step 1114. Interface unit 202 then selects the server hosting the content specified by the path name, as shown in step 1116.

In step 1118, interface unit 202 determines whether client C2 has selected the same server as client C1. If the outcome to step 1118 is negative, then interface unit 202 proceeds in a fashion necessary to satisfy client C2's request (which is not important to the present invention). At this point the flowchart in FIG. 11 ends. Alternatively, if the outcome to step 1118 is positive, then interface unit 202 determines whether there are any open connections to the selected server, as shown in step 1120.

If the outcome to step 1120 is positive, then interface unit 202 proceeds in a fashion necessary to satisfy client C2's request (which is not important to the present invention). At this point the flowchart in FIG. 11 ends. Alternatively, if the outcome to step 1120 is negative, then interface unit 202 utilizes the fact that chunk-size field equaled zero in step 1112 to confirm that client C1 received all of the message data that client C1 requested. It is important to note that interface unit 202 does not wait for client C1 to send a FIN or RST command in order to determine that client C1 is finished with the connection or is in "think time".

In step 1122, interface unit 202 then translates the request and passes the translated request to the selected server using the same connection as client C1 used. Interface unit 202 receives the response from server S, as shown in step 1124, Interface unit 202 then translates the response and passes the translated response on to client C2 until chunk-size field equals zero, as shown in step 1126. Interface unit 202 utilizes the chunk-size field to confirm that client C2 received all of the message data that client C2 requested.

Next, interface unit 202 closes or delinks the connection with client C2 in step 1128. Finally, interface unit 202 closes or delinks the connection with client C1 in step 1130, and the flowchart in FIG. 11 ends. As stated above with reference to FIG. 10, the sequence of events as they were described with reference to FIG. 11 is for illustration purposes only and does not limit the present invention.

Figure 12:
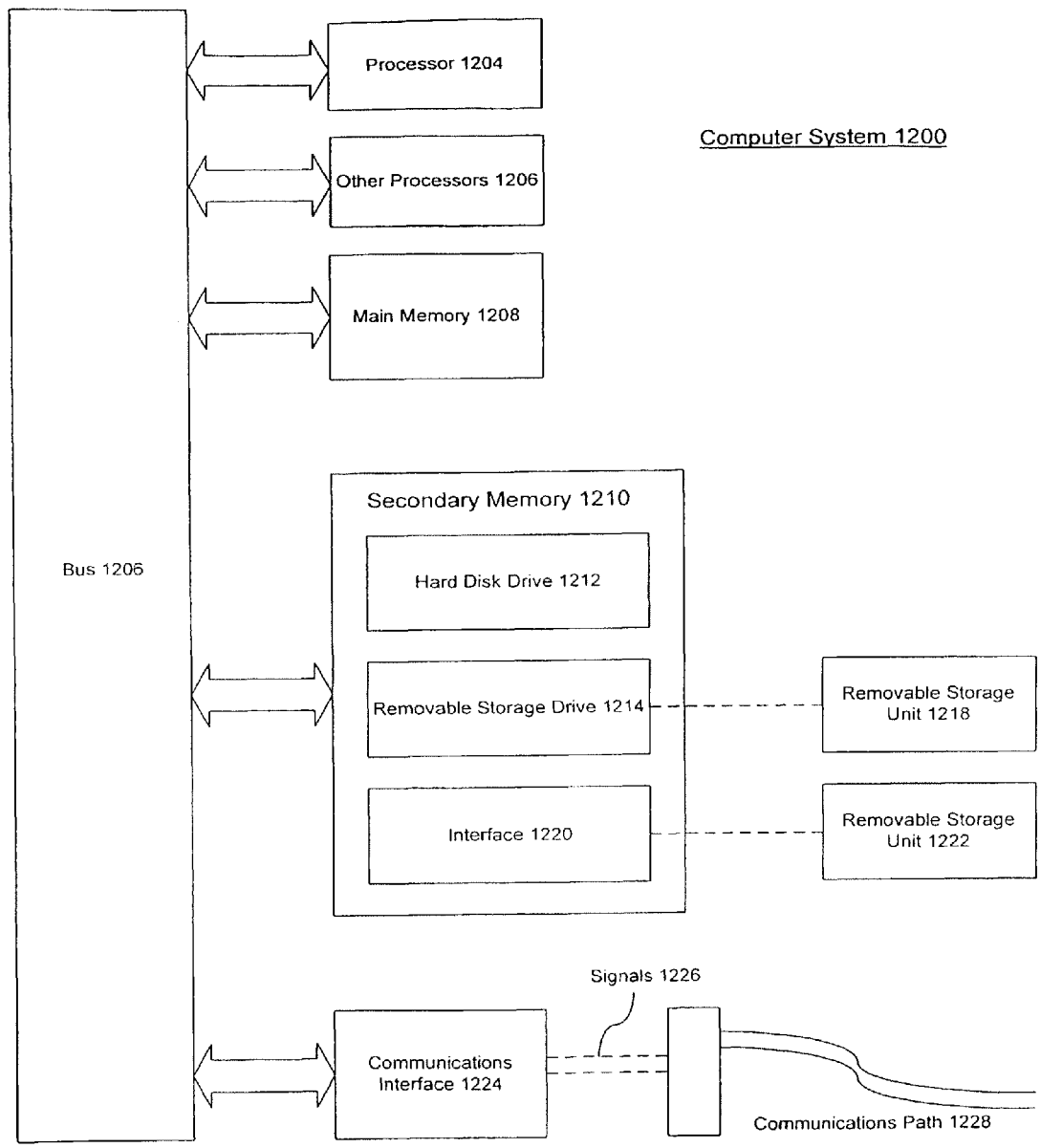
FIG. 12 depicts an example computer system in which the present invention can be implemented according to an embodiment of the present invention.

The present invention may be implemented using hardware, software or a combination thereof and may be implemented in a computer system or other processing system. In fact, in one embodiment, the invention is directed toward one or more computer systems capable of carrying out the functionality described herein. An example computer system 1200 is shown in FIG. 12. The computer system 1200 includes one or more processors, such as processor 1204. The processor 1204 is connected to a communication bus 1206. Various software embodiments are described in terms of this example computer system. After reading this description, it will become apparent to a person skilled in the relevant art how to implement the invention using other computer systems and/or computer architectures.

Computer system 1200 also includes a main memory 1208, preferably random access memory (RAM), and can also include a secondary memory 1210. The secondary memory 1210 can include, for example, a hard disk drive 1212 and/or a removable storage drive 1214, representing a floppy disk drive, a magnetic tape drive, an optical disk drive, etc. The removable storage drive 1214 reads from and/or writes to a removable storage unit 1218 in a well known manner. Removable storage unit 1218, represents a floppy disk, magnetic tape, optical disk, etc. which is read by and written to by removable storage drive 1214. As will be appreciated, the removable storage unit 1218 includes a computer usable storage medium having stored therein computer software and/or data.

In alternative embodiments, secondary memory 1210 may include other similar means for allowing computer programs or other instructions to be loaded into computer system 1200. Such means can include, for example, a removable storage unit 1222 and an interface 1220. Examples of such can include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1218 to computer system 1200.

Computer system 1200 can also include a communications interface 1224. Communications interface 1224 allows software and data to be transferred between computer system 1200 and external devices. Examples of communications interface 1224 can include a modem, a network interface (such as an Ethernet card), a communications port, a PCM-CIA slot and card, etc. Software and data transferred via communications interface 1224 are in the form of signals which can be electronic, electromagnetic, optical or other signals capable of being received by communications interface 1224, These signals 1226 are provided to communications interface via a channel 1228. This channel 1228 carries signals 1226 and can be implemented using wire or cable, fiber optics, a phone line, a cellular phone link, an RF link and other communications channels.

In this document, the terms "computer program medium" and "computer usable medium" are used to generally refer to media such as removable storage device 1218, a hard disk installed in hard disk drive 1212, and signals 1226. These computer program products are means for providing software to computer system 1200.

Computer programs (also called computer control logic) are stored in main memory and/or secondary memory 1210. Computer programs can also be received via communications interface 1224. Such computer programs, when executed, enable the computer system 1200 to perform the features of the present invention as discussed herein. In particular, the computer programs, when executed, enable the processor 1204 to perform the features of the present invention. Accordingly, such computer programs represent controllers of the computer system 1200.

In an embodiment where the invention is implemented using software, the software may be stored in a computer program product and loaded into computer system 1200 using removable storage drive 1214, hard drive 1212 or communications interface 1224. The control logic (software), when executed by the processor 1204, causes the processor 1204 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

The present invention is described specifically when implemented within an interface unit, such as interface unit 202, that is connected to servers in a farm for the purpose of offloading connection processing overhead from the servers. However, the present invention can also be applied within other kinds of devices that are in the network connection path between the client and the servers. As network traffic flows through such devices, they all have the opportunity to apply the present invention to offload connection processing. Some examples of such devices are:

Load Balancers which distribute client network connections between a set of servers in a server farm (local or geographically distributed). The invention can readily be combined with the load balancing function.

Bandwidth managers which monitor network traffic and meter packet flow. These devices can also use the present invention.

Firewalls monitor packets and allow only the authorized packets to flow through. The present invention can be used to provide an additional feature within firewalls.

Routers and switches also lie in the path of the network traffic. The industry trend is to integrate additional functionality (such as load balancing, bandwidth management and firewall functionality) within these devices. Hence, the present invention can easily be incorporated into a router.

The specific integration of the present invention into each one of the above devices is implementation specific.

The present invention can also be applied within computer systems which are the end points of network connections. In this case, add-on cards can be used to implement the invention and thus offload the main processing elements within the computer system.

CONCLUSION

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method comprising:
   (a) establishing, by a device, a pool of one or more transport layer connections between the device and a server;
   (b) forwarding, by the device, a first request of a first client to the server received via a first connection between the first client and the device over a second transport layer connection from the pool of one or more transport layer connections between the device and the server;
   (c) determining, by the device while the device maintains open the transport layer connection of the pool of one or more transport layer connections between the device and the server, that the second transport layer connection is available for forwarding a second request of a second client via a third transport layer connection between the second client and the device to the server based on the server completing communicating a response to the first request of the first client via the second transport layer connection;
   (d) forwarding, by the device responsive to the determination, the second request of the second client over the transport layer connection to the server prior to receiving a close command from the first client via the first transport layer connection between the first client and the device.

2. The method of claim 1, further comprising maintaining, by the device, the pool of one or more transport layer connections with the server open while closing one or more transport layers connections between the device and one or more clients accessing the server via the pool of one or more transport layer connections.

3. The method of claim 2, further comprising receiving, by the device while maintaining the pool of one or more transport layer connections with the server open, one or more close commands to close the one or more transport layer connections with the one or more clients.

4. The method of claim 1, wherein step (a) further comprises establishing, by the device, a second pool of one or more transport layer connections between the device and a second server.

5. The method of claim 4, further comprising forwarding, by the device, requests of different clients to the second server via the one or more transport layer connections of the second pool while forwarding requests of different clients to the server via the pool of one more transport layer connections.

6. The method of claim 1, wherein step (b) further comprises forwarding, by the device while maintaining the second transport layer connection open, the first request over the second transport layer connection after the device receives a response from another request of another client.

7. The method of claim 1, wherein step (c) further comprises determining, by the device, via a content length parameter identified in the response that a last byte of the application data has been communicated from the server for the request.

8. The method of claim 1, wherein step (c) further comprises determining, by the device, via a chunk-size field identified in the response that a last byte of the application data has been communicated from the server for the request.

9. A system comprising:
   a device configured to establish a pool of one or more transport layer connections between the device and a server and forward a first request of a first client to the server received via a first transport layer connection between the first client and the device over a second transport layer connection from the pool of one or more transport layer connections;
   wherein the device is configured to
      determine, while the device maintains open the transport layer connection of the pool of one or more transport layer connections between the device and the server, that the second transport layer connection is available for forwarding a second request of a second client received via a third transport layer connection between the second client and the device to the server based on the server completing communicating a response to the first request of the first client via the second transport layer connection and responsive to the determination forward the second request of the second client over the second transport layer connection to the server,
      forward the second request of the second client over the transport layer connection prior to receiving a close command from the first client via the first connection between the first client and the device, and
      subsequently receive the close command from the first client via the first transport layer connection between the first client and the device to close the first transport layer connection between the first client and the device.

10. The system of claim 9, wherein the device is further configured to maintain the pool of one or more transport layer connections with the server open while closing one or more transport layers connections between the device and one or more clients accessing the server via the pool of one or more transport layer connections.

11. The system of claim 10, wherein the device is further configured to receive, while maintaining the pool of one or more transport layer connections with the server open, one or more close commands to close the one or more transport layer connections with the one or more clients.

12. The system of claim 9, wherein the device is further configured to establish a second pool of one or more transport layer connections between the device and a second server.

13. The system of claim 12, wherein the device is further configured to forward requests of different clients to the second server via the one or more transport layer connections of the second pool while forwarding requests of different clients to the server via the pool of one more transport layer connections.

14. The system of claim 9, wherein the device is further configured to forward, while maintaining the second transport layer connection open, the first request over the second transport layer connection after the device receives a response from another request of another client.

15. The system of claim 9, wherein the device is further configured to determine, via a content length parameter identified in the response that a last byte of the application data has been communicated from the server for the request.

16. The system of claim 9, wherein the device is further configured to determine via a chunk-size field identified in the response that a last byte of the application data has been communicated from the server for the request.

17. The method of claim 1, further comprising, subsequent to step (d), forwarding, by the device, a second request of the first client to the server over the second transport layer connection from the pool of one or more transport layer connections.

18. The method of claim 1, wherein step (d) comprises forwarding, by the device, a second request of the second client over the second transport layer connection prior to receiving a FIN or an RST command from the first client.

19. The system of claim 9, wherein the device is further configured to forward a second request of the first client to the server over the second transport layer connection from the pool of one or more transport layer connections.

20. The method of claim 9, wherein the device is further configured to forward a second request of the second client over the second transport layer connection prior to receiving a FIN or an RST command from the first client.

* * * * *